US008255136B2

(12) United States Patent
Bentner et al.

(10) Patent No.: US 8,255,136 B2
(45) Date of Patent: Aug. 28, 2012

(54) METHOD AND ARRANGEMENT FOR RUNNING IN AND CALIBRATING AN ELECTROMECHANICAL PARKING BRAKE SYSTEM

(75) Inventors: Johannes Bentner, Pentling (DE); Alexander Kalbeck, Burglengenfeld (DE)

(73) Assignee: Continental Automotive GmbH, Hannover (DE)

( * ) Notice: Subject to any disclaimer, the term of this patent is extended or adjusted under 35 U.S.C. 154(b) by 793 days.

(21) Appl. No.: 12/188,268

(22) Filed: Aug. 8, 2008

(65) Prior Publication Data

US 2009/0043472 A1    Feb. 12, 2009

(30) Foreign Application Priority Data

Aug. 9, 2007   (DE) .................. 10 2007 037 616

(51) Int. Cl.
*G06F 7/70*     (2006.01)
*B60W 10/04*    (2006.01)

(52) U.S. Cl. ........................... 701/70; 477/188

(58) Field of Classification Search .................. None
See application file for complete search history.

(56) References Cited

U.S. PATENT DOCUMENTS

| | | | | |
|---|---|---|---|---|
| 6,959,969 B2 * | 11/2005 | Simpson et al. | ................ | 303/20 |
| 2005/0194836 A1 * | 9/2005 | Simpson et al. | ................ | 303/20 |
| 2005/0258681 A1 * | 11/2005 | Fulks et al. | ................ | 303/3 |
| 2005/0270177 A1 * | 12/2005 | Mori et al. | ................ | 340/932.2 |
| 2007/0240947 A1 * | 10/2007 | Goss et al. | ................ | 188/158 |
| 2007/0252098 A1 * | 11/2007 | Schmidt et al. | ................ | 251/129.01 |
| 2007/0299566 A1 * | 12/2007 | Goss et al. | ................ | 701/1 |
| 2008/0283346 A1 * | 11/2008 | Ralea | ................ | 188/156 |
| 2009/0251284 A1 * | 10/2009 | Wilson et al. | ................ | 340/5.64 |

* cited by examiner

*Primary Examiner* — Thomas Tarcza
*Assistant Examiner* — Nagi Murshed
(74) *Attorney, Agent, or Firm* — King & Spalding L.L.P.

(57) ABSTRACT

A method and arrangement for running in and calibrating an electromechanical parking brake system (EPB) has at least one brake mechanism unit (BME) and at least one control device (SG), the actuation of the brake mechanism unit (BME) being controlled by a control routine (SR) provided in the control device (SG). The electromechanical parking brake system (EPB) is advantageously run in by at least one running-in routine (EFR) and/or calibrated by at least one calibration routine (KRR), the running-in routine (EFR) and/or the calibration routine (KRR) checking for the existence of at least one safety-critical condition (SB) and/or the existence of at least one system error (SF) before and/or during the running-in operation and/or calibration operation and in dependence thereon the running-in operation and/or calibration operation is continued or terminated.

11 Claims, 2 Drawing Sheets

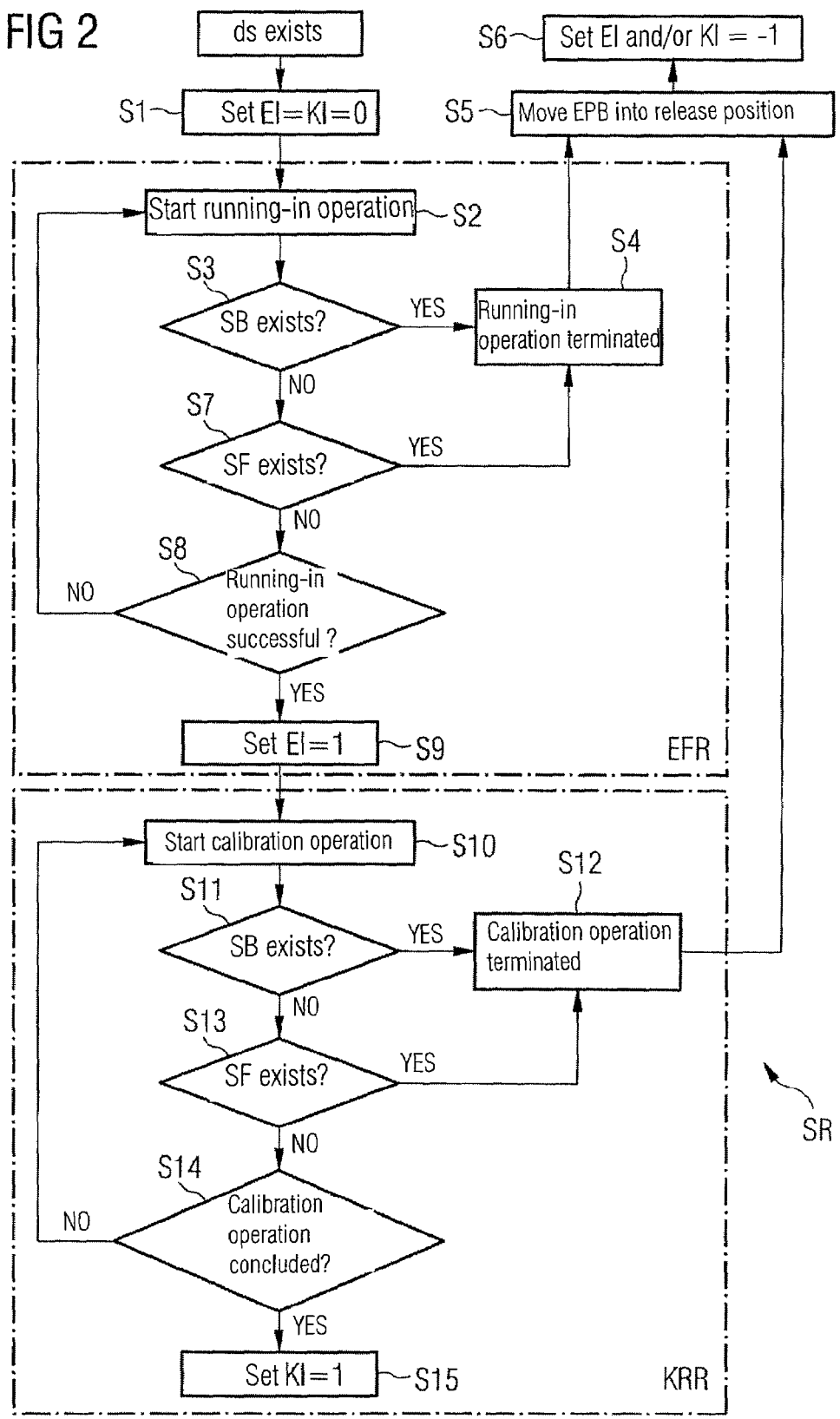

METHOD AND ARRANGEMENT FOR RUNNING IN AND CALIBRATING AN ELECTROMECHANICAL PARKING BRAKE SYSTEM

CROSS-REFERENCE TO RELATED APPLICATIONS

This application claims priority to German application number 10 2007 037 616.4 filed Aug. 9, 2007, the contents of which is hereby incorporated by reference in its entirety.

TECHNICAL FIELD

The invention relates to a method and an arrangement for running in and calibrating an electromechanical parking brake system comprising at least one brake mechanism unit and one control device according to the preamble of claims 1 and 10.

BACKGROUND

From the prior art different electromechanical parking brake systems comprising at least one brake mechanism unit and at least one control device are known, in which in each case the at least one control device controls the actuation, i.e. the application and release of the brake mechanism unit for braking the vehicle. Such electromechanical parking brake systems will in future to an increasing extent replace by conventional, purely mechanical hand brakes and/or parking brakes of a vehicle.

Besides additional safety and comfort functions, an electromechanical parking brake system offers the possibility of determining the operating state by direct evaluation of the force-displacement-current characteristics of the brake mechanism unit, it being possible for the brake mechanism unit depending on the form of construction to be formed by a plurality of mechanical, electronic and/or electromechanical components. In particular, methods of determining system errors of such electromechanical parking brake systems by evaluation of the measured force-displacement-current characteristics are already known from the prior art.

If in particular the mechanical elements and/or brake components provided inside such an electromechanical parking brake system are new and therefore not stressed, then before the first start-up of such an electromechanical parking brake system it is necessary to carry out running-in and calibration of the electromechanical parking brake system.

Especially the brake mechanism unit or its mechanical components, such as for example a wrap springs, brake cables, brake linings etc., require a defined minimum extent of actuation to achieve the normal working range. By running in the electromechanical parking brake system is meant a first actuation of the fitted mechanical components to a defined minimum extent.

If such a minimum extent of actuation does not occur, then, when the electromechanical parking brake system disposed in the vehicle is actuated for the first time, extreme variations of the control parameters from the respective assigned control characteristic arise, which may be interpreted by the control device of the electromechanical parking brake system as system errors and therefore lead to a system failure.

Up till now, in order to avoid such system errors, electromechanical parking brake systems or their components after their manufacture and even before installation in the respective vehicle have been checked for their operating capability by means of suitable diagnostic methods and associated external diagnostic units, and in particular a running-in and calibration of the electromechanical parking brake system has been carried out. Furthermore, after a repair to the electromechanical parking brake system or the exchange of defective brake components a fresh running-in and calibration operation is to be carried out.

Via a corresponding diagnostic interface, which is optionally provided on the brake component to be checked, control commands externally generated by a diagnostic unit are transmitted to the electromechanical parking brake system and bring about an application and release of the brake mechanism unit. The result is a simulation of defined braking cycles or braking scenarios. The drawback of such external diagnostic methods is that they in no way take account of vehicle parameters that are critical with regard to safety, such as for example the vehicle velocity.

SUMMARY

A method of running in and/or calibrating an electromechanical parking brake system can be provided that allows a reliable first start-up of an electromechanical parking brake system also with regard to safety-critical vehicle situations.

According to an embodiment, a method of running in and calibrating an electromechanical parking brake system may comprise at least one brake mechanism unit and at least one control device, the actuation of the brake mechanism unit being controlled by means of a control routine provided in the control device. The method may comprise the steps of: running in the electromechanical parking brake system by means of at least one running-in routine and/or calibrating the electromechanical parking brake system by means of at least one calibration routine, wherein the running-in routine and/or the calibration routine checking for the existence of at least one safety-critical condition and/or the existence of at least one system error before and/or during the running-in operation or calibration operation and in dependence thereon, continuing or terminating the running-in operation or calibration operation.

According to a further embodiment, given the existence of at least one safety-critical conditions and/or at least one system error the electromechanical parking brake system may be set to a defined operating state, in particular may be moved into a defined release position. According to a further embodiment, during the running-in operation a defined minimum number of apply-and-release operations is carried out by the at least one brake mechanism unit. According to a further embodiment, in dependence upon the existence of a diagnostic signal generated by, e.g. a preferably external diagnostic unit the control routine and/or the running-in routine and the calibration routine are executed. According to a further embodiment, at least one item of running-in information and/or at least one item of calibration information are generated, which indicate the successful execution of a running-in operation and/or a calibration operation. According to a further embodiment, the item of running-in information and/or the at least one item of calibration information before or during the start of the running-in routine and/or the calibration routine is assigned a start value that indicates no successful execution of a running-in operation and/or a calibration operation. According to a further embodiment, after successful execution of the running-in routine the item of running-in information is assigned a value that indicates the successful execution of the running-in operation. According to a further embodiment, after successful execution of the calibration routine the item of calibration information is assigned a value that indicates the successful execution of the calibration operation. According to a further embodiment, the item of running-in information and/or the item of calibration information is indicated to the driver of a vehicle having the electromechanical parking brake system.

According to another embodiment, an arrangement for running in and calibrating an electromechanical parking brake system may comprise at least one brake mechanism unit and at least one control device connected to the at least one brake mechanism unit, a control routine being provided in the control device for activating the brake mechanism unit, wherein the control routine may comprise at least one running-in routine for running in the electromechanical parking brake system and/or at least one calibration routine for calibrating the electromechanical parking brake system, the running-in routine and/or the calibration routine being operable to check for the existence of at least one safety-critical condition and/or the existence of at least one system error before and/or during the running-in operation and/or calibration operation and is further operable to continue or terminate in dependence thereon the running-in operation and/or calibration operation.

BRIEF DESCRIPTION OF DRAWINGS

The invention is described in more detail below with an embodiment of the invention with reference to drawings, in which;

FIG. 1 shows an exemplary block diagram of an electromechanical parking brake system and FIG. 2 shows an exemplary flowchart of a control routine for running in and calibrating the electromechanical parking brake system according to FIG. 1.

DETAILED DESCRIPTION

Figure 1:
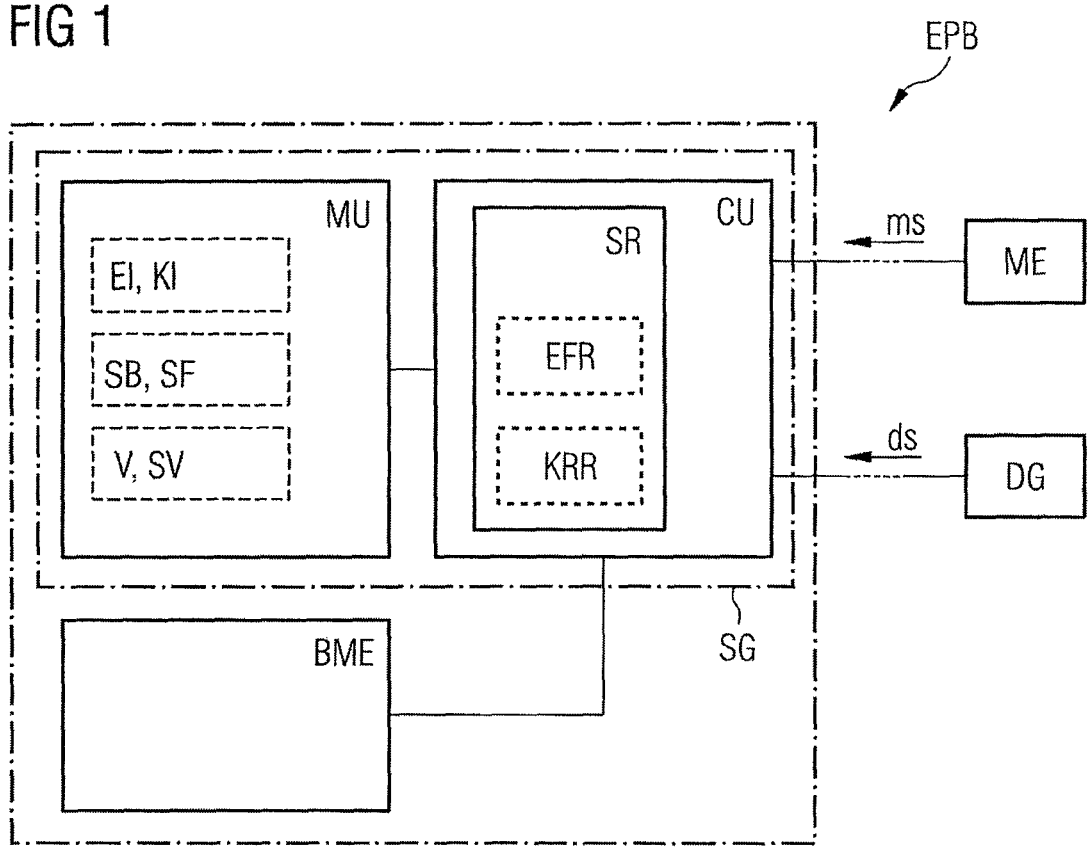

A central aspect of the method according to various embodiments can be perceived to be that the electromechanical parking brake system is run in by means of at least one running-in routine and/or calibrated by means of at least one calibration routine, the running-in routine and/or the calibration routine checking for the existence of at least one safety-critical condition and/or the existence of at least one system error before and/or during the running-in operation and/or calibration operation is checked and in dependence thereon the running-in operation and/or calibration operation is continued or terminated. It may be particularly advantageous that the running-in operation and/or calibration operation is carried out by the electronic parking brake system itself, with system errors and safety-critical conditions that arise during these operations being monitored. If, for example, the running-in operation is started externally, the introductory and/or calibration routine in this case checks whether safety-critical conditions exist, under which the respective operation should be terminated for safety reasons. If, for example, the vehicle velocity exceeds a defined velocity threshold, then the running-in operation is to be stopped and/or aborted.

FIG. 1 shows by way of example in a schematic block diagram an electromechanical parking brake system EPB comprising an integrated control device SG and at least one brake mechanism unit BME, the control device SG comprising a control unit CU, to which a memory unit MU is connected.

In an embodiment, for each wheel of a vehicle a brake mechanism unit BME is provided, which is connected in each case to the control device SG of the electromechanical parking brake system EPB or with which in each case a control device SG is associated. In an alternative embodiment, the control device SG may be disposed spatially separate from the brake mechanism unit BME or may be simultaneously accommodated in a pre-existing control device of a vehicle (not represented in FIG. 1).

The brake mechanism unit BME may be composed of different mechanical, electrical and/or electromechanical components, for example it may comprise at least one electric motor/gear unit for generating an actuating force, which is connected directly or indirectly to a mechanical brake that is designed to generate a brake force for braking at least one wheel of a vehicle. For example, the electric motor/gear unit may be workingly connected by a Bowden cable system to at least one mechanical brake. The activation of the brake mechanism unit BME is realized in this case by means of a control routine SR executed in the control unit CU.

After the brake mechanism unit BME has been manufactured and/or spare parts have been fitted in an existing brake mechanism unit BME, the various components of the brake mechanism unit BME have to be run in and calibrated in order to guarantee a trouble-free mode of operation of the electromechanical parking brake system EPB in the vehicle.

For control of the running-in and calibration of the electromechanical parking brake system EPB, the control routine SR comprises at least one running-in routine EFR and at least one calibration routine KRR, by means of which the running-in operation and the calibration operation of the electromechanical parking brake system EPB are individually controllable. For example, by means of the running-in routine EFR a minimum number of apply-and-release operations that are to be carried out free of error may be specified, which is determined by statistical evaluations.

There is further connected to the control device SG at least one measuring unit ME, by means of which at least the current vehicle velocity V may be measured and transmitted in the form of a measuring signal ms to the control device SG, in particular to the control unit CU. The measuring signal ms may be transmitted for example via a wireless and/or wirebound interface from the measuring unit ME to the control unit CU. In an embodiment, the current vehicle velocity V determined from the measuring signal ms is temporarily stored optionally together with the measuring time in the memory unit MU.

A preferably external diagnostic unit DG for example may be further connectable to the electromechanical parking brake system EPB and may be designed to generate and transmit at least one diagnostic signal ds.

In FIG. 2 the control routine SR, which is executed in the control unit CU and by means of which a running in and calibration of the electromechanical parking brake system EPB is carried out, is represented by way of example in the form of a flowchart.

The start of the control routine SR occurs in this case in dependence upon the existence of the diagnostic signal ds, which is generated by the external diagnostic unit DG and transmitted to the control device SG. Alternatively, different diagnostic signals ds may be provided for starting the individual execution routines, namely the running-in routine EFR and the calibration routine KRR.

In order to be able to detect an error-related abnormal termination of the running-in routine EFR and the calibration routine KRR by the control routine SR, for example prior to the start of the running-in routine EFR and/or the calibration routine KRR at least one item of information that marks the respective operation as not yet fully concluded is filed in the memory unit MU. This item of information is used in particular also to stop an actuation of the electromechanical parking brake system EPB in the absence of a correct and successful execution of the running-in operation and the calibration operation.

After the diagnostic signal has been received, therefore, for example in a first step S1 of the method according to an embodiment in the memory unit MU of the control device SG an item of running-in information EI and/or an item of calibration information KI is generated and stored in the memory unit MU or, if it already exists, is set to a defined start value. The start value indicates for example that there has previously been no successful running-in operation and/or calibration operation. In the present exemplary embodiment, the start value zero for example is assigned to the item of running-in information EI and/or the item of calibration information KI. In an alternative embodiment, this start value may already be filed as a default state in the memory unit MU.

In a second step S2 the running-in routine EFR and hence the running-in operation is started. In a third step S3 it is then checked whether defined safety-critical conditions SB exist, under which the running-in operation and hence the running-in routine EFR optionally have to be interrupted. In this case, the existence of one or more safety-critical conditions SB may be checked. For example, as one of a plurality of safety-critical conditions SB the current vehicle velocity V may be determined and compared with a defined velocity threshold value SV, the exceeding of which leads to the immediate interruption of the running-in operation for safety reasons. Alternatively or additionally, as a further safety-critical condition SB an interrogation of the external diagnostic unit may be effected via a special security access, by means of which the physical connection and/or the correct operating state of the external diagnostic unit is checked. The interrogation and the correct entry of a special access code ("security access") may also be checked, such access codes conventionally being used for the safety disconnection of extended test functions of a control device.

If the existence of at least one of the safety-critical conditions SB is detected by the running-in routine EFR, then in a fourth step S4 the running-in operation is abnormally terminated and in a fifth step S5 the electromechanical parking brake system EPB is set to a defined operating state, being namely moved for example into a defined release position. In a subsequent sixth step S6 the item of running-in information EI is correspondingly updated. The updated item of running-in information EI indicates the abnormal termination of the running-in operation. For example, for this purpose the value −1 may be assigned to the item of running-in information EI. In the event of an abnormal termination of the running-in routine EFR, the control routine SR returns to the normal mode of operation of the electronic parking brake system EPB, in which an activation of the electronic parking brake system EPB is stopped because of the faulty running-in operation.

If however the existence of no safety-critical conditions SB is detected in the third step S3, then in a seventh step S7 the electromechanical parking brake system EPB is checked for system errors SF. As system errors SF, for example a cable fracture, a sensor defect or motor defect are detected by the running-in routine EFR and correspondingly indicated. Upon detection of such a system error SF, according to the fourth step S4 the running-in operation is abnormally terminated and/or discontinued. Then the fifth and sixth steps S5, S6 are executed in the manner described above.

If the running-in routine EFR detects neither the existence of defined safety-critical conditions SB nor the existence of at least one system error SF, then in an eighth step S8 the running-in operation is started and/or continued and the brake mechanism unit BME is activated to apply and/or release the mechanical brake a plurality of times. A plurality of apply-and-release operations with optionally differing, also parameterizable force values can also be implemented in a controlled fashion by way of the running-in routine EFR.

It is only after a successful conclusion that in a ninth step S9 the item of running-in information EI is updated, namely is assigned for example the value 1, which indicates a successful execution of the running-in operation. In the event of a successful conclusion of the running-in operation, the item of running-in information EI may be relayed by the control device SG to the external diagnostic unit as positive confirmation information that may additionally be made available also to further systems.

Following the successful execution of the running-in routine EFR, by means of the control routine SR in a tenth step S10 the calibration routine KRR is started and hence a calibration operation or a calibration of the electromechanical parking brake system EPB is carried out. The calibration parameters (not represented in the figures) determined during this operation are stored for example in the memory unit MU of the control device SG.

In an eleventh step S11 within the calibration routine KRR it is checked anew whether defined safety-critical conditions SB analogous to the third step S3 exist. If such safety-critical conditions SB exist, then in a twelfth step S12 the calibration operation is terminated and the fifth and sixth steps S5, S6 are carried out. In the sixth step S6 the item of calibration information KI is updated, being namely assigned a value, for example −1, indicating the abnormal termination of the calibration operation. The item of calibration information KI is likewise for example relayed to the diagnostic unit DG or made available to further system provided in the vehicle. In addition, the driver may be alerted to the abnormal termination of the calibration operation for example by means of an alarm device that may be formed by audible, visual or haptic indicating means.

If none of the defined safety-critical conditions SB exists, then in a thirteenth step S13 a further check is made for the occurrence of a system error SF and, if such a system error SF exists, according to the twelfth step S12 the calibration operation is abnormally terminated. This is followed in the fifth step S5 by a move to a defined release position and in the sixth step S6 by the corresponding updating of the item of calibration information KI.

If no system error is detected in the thirteenth step S13, then the calibration operation is continued, namely until it is concluded. The successful conclusion of the calibration operation is checked in the fourteenth step S14 in a similar manner to the running-in routine EFR.

After a successful conclusion of the calibration operation, in a fifteenth step S15 the item of calibration information KI is correspondingly updated, being namely assigned a value, in particular 1, that indicates the successful conclusion of the calibration operation. In the event of a successful conclusion of the calibration operation, the item of calibration information KI may likewise be relayed as positive confirmation information by the control device SG to the external diagnostic unit and to further systems provided in the vehicle.

In a further embodiment, the control routine SR by monitoring diverse actuating operations, micro-switches and sensor signals detects an exchange of individual mechanical components of the brake mechanism unit BME and, having detected such an exchange, by setting the associated item of running-in information EI and/or calibration information KI in accordance with the first step S1 prevents a further actuation of the electromechanical parking brake system EPB in the absence of the successful execution of the running-in operation and/or the calibration operation.

In an embodiment, the brake mechanism unit BME in the release position according to the fifth step S5 has the maximum possible approach travel.

In a particularly advantageous manner the method according to an embodiment enables a purposeful running-in and calibration of the electromechanical parking brake system EPB that may respond at any time to safety-critical conditions and/or system errors and hence markedly increases the safety of such an operation. In particular, both during production and later during servicing of the vehicle it may be guaranteed that all of the necessary running-in and calibration operations are carried out correctly and in full, so that the electromechanical parking brake system EPB in the normal mode of operation works reliably within the standard tolerances, with the result that a faulty deviation from these tolerances is detected much earlier and more efficiently.

The invention was described above by way of an exemplary embodiment. It is self-evident that numerous changes and modifications are possible without departing from the underlying idea of the invention.

| List of reference characters | |
|---|---|
| BME | brake mechanism unit |
| CU | control unit |
| DO | diagnostic unit |
| ds | diagnostic signal |
| EFR | running-in routine |
| EI | item of running-in information |
| EPB | electromechanical parking brake system |
| KI | item of calibration information |
| KRR | calibration routine |
| ME | measuring unit |
| ms | measuring signal |
| MU | memory unit |
| S1-S14 | method steps |
| SB | safety-critical conditions |
| SF | system error |
| SO | control device |
| SR | control routine |
| SV | velocity threshold value |
| V | velocity |

The invention claimed is:

1. A method of running in an electromechanical parking brake system comprising at least one brake mechanism unit and at least one control device, the actuation of the brake mechanism unit being controlled by means of a control routine provided in the control device, the method comprising the steps of:
executing a running-in routine involving a minimum amount of actuation of the at least one brake mechanism unit in order to achieve a normal working range for the at least one brake mechanism unit, the running-in routine including:
performing a defined minimum plurality of apply-and-release braking operations carried out by the at least one brake mechanism unit;
checking the electromechanical parking brake system for system errors during the plurality of apply-and-release braking operations of the at least one brake mechanism unit;
checking for the existence of at least one condition selected from the group of conditions consisting of: (a) at least one safety-critical condition present before the at least one running-in operation, (b) at least one system error present before the at least one running-in operation, (c) at least one safety-critical condition occurring during the at least one running-in operation, and (d) at least one system error occurring during the at least one running-in operation;
continuing or terminating the running-in routine based on the results of the checking step;
generating an item of running-in information that indicates the status of the running-in routine; and
after successful execution of the running-in routine, assigning the item of running-in information a value that indicates the successful execution of the running-in routine.

2. The method according to claim 1, wherein, given the existence of at least one safety-critical conditions or at least one system error, the electromechanical parking brake system is set to a defined operating state or is moved into a defined release position.

3. The method according to claim 1, wherein in dependence upon the existence of a diagnostic signal generated by an external diagnostic unit, the control routine or the running-in routine is executed.

4. The method according to claim 1, wherein the item of running-in information before or during the start of the running-in routine is assigned a start value that indicates no successful execution of a running-in operation.

5. The method according to claim 1, wherein the item of running-in information or the item of calibration information is indicated to the driver of a vehicle having the electromechanical parking brake system.

6. An arrangement for running in an electromechanical parking brake system comprising at least one brake mechanism unit and at least one control device connected to the at least one brake mechanism unit, a control routine being provided in the control device for activating the brake mechanism unit, wherein the control routine comprises a running-in routine for achieving a normal working range for the at least one brake mechanism unit the running-in routine being operable to:
perform a defined minimum plurality of apply-and-release braking operations carried out by the at least one brake mechanism unit;
check the electromechanical parking brake system for system errors during the plurality of apply-and-release braking operations of the at least one brake mechanism unit;
check for the existence of at least one condition selected from the group of conditions consisting of: (a) at least one safety-critical condition present before the at least one running-in operation, (b) at least one system error present before the at least one running-in operation, (c) at least one safety-critical condition occurring during the at least one running-in operation, and (d) at least one system error occurring during the at least one running-in operation,
to continue or terminate the running-in operation based on the results of the checking;
to generate an item of running-in information that indicates the status of the running-in routine; and
after successful execution of the running-in routine, to assign the item of running-in information a value that indicates the successful execution of the running-in routine.

7. A method of running in an electromechanical parking brake system comprising at least one brake mechanism unit and at least one control device, the actuation of the brake mechanism unit being controlled by means of a control routine provided in the control device, the method comprising the steps of:

executing a running-in routine involving a minimum amount of actuation of the at least one brake mechanism unit in order to achieve a normal working range for the at least one brake mechanism unit, the running-in routine including:

performing a defined minimum plurality of apply-and-release braking operations carried out by the at least one brake mechanism unit;

checking the electromechanical parking brake system for system errors during the plurality of apply-and-release braking operations of the at least one brake mechanism unit;

checking for the existence of at least one condition selected from the group of conditions consisting of: (a) at least one safety-critical condition present before the at least one running-in operation, (b) at least one system error present before the at least one running-in operation, (c) at least one safety-critical condition occurring during the at least one running-in operation, and (d) at least one system error occurring during the at least one running-in operation;

and in dependence thereon, continuing or terminating the running-in routine generating an item of running-in information that indicates the status of the running-in routine; and after successful execution of the running-in routine, assigning the item of running-in information a value that indicates the successful execution of the running-in routine.

8. The method according to claim 7, wherein, given the existence of at least one safety-critical conditions or at least one system error, the electromechanical parking brake system is set to a defined operating state or is moved into a defined release position.

9. The method according to claim 7, wherein in dependence upon the existence of a diagnostic signal generated by an external diagnostic unit the control routine, the running-in routine is executed.

10. The method according to claim 7, wherein the item of running-in information before or during the start of the running-in routine is assigned a start value that indicates no successful execution of a running-in operation.

11. The method according to claim 7, wherein the item of running-in information or the item of calibration information is indicated to the driver of a vehicle having the electromechanical parking brake system.

* * * * *